United States Patent
Hirayama et al.

(10) Patent No.: US 9,746,217 B2
(45) Date of Patent: Aug. 29, 2017

(54) EVAPORATOR WITH COOL STORAGE FUNCTION

(71) Applicant: KEIHIN THERMAL TECHNOLOGY CORPORATION, Oyama-shi (JP)

(72) Inventors: Takashi Hirayama, Oyama (JP); Osamu Kamoshida, Oyama (JP); Naohisa Higashiyama, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 784 days.

(21) Appl. No.: 14/106,858

(22) Filed: Dec. 16, 2013

(65) Prior Publication Data

US 2014/0165647 A1    Jun. 19, 2014

(30) Foreign Application Priority Data

Dec. 17, 2012 (JP) ................... 2012-274355

(51) Int. Cl.
*F28F 1/00* (2006.01)
*F25B 39/02* (2006.01)
(Continued)

(52) U.S. Cl.
CPC .......... *F25B 39/022* (2013.01); *F28D 1/0333* (2013.01); *F28D 20/02* (2013.01); *F25B 2400/24* (2013.01); *F28D 1/05391* (2013.01); *F28D 2020/0013* (2013.01); *F28D 2021/0085* (2013.01); *Y02E 60/145* (2013.01)

(58) Field of Classification Search
CPC .... F25B 39/022; F25B 2400/24; F25B 39/02; F25B 39/024; F25D 21/14; F28B 9/08; F28F 17/005; F28F 1/006; F28F 2001/027; F28F 1/025; F28F 1/06; F28F 1/08;
(Continued)

(56) References Cited

U.S. PATENT DOCUMENTS 7,416,481 B2 * 8/2008 Baker .................. F04D 25/14
361/679.48
2011/0239696 A1 * 10/2011 Takagi ............... B60H 1/00335
62/524

FOREIGN PATENT DOCUMENTS

JP   2012-042167   3/2012
JP   2012-137199   7/2012
JP   2012193867 A * 10/2012

* cited by examiner

*Primary Examiner* — Frantz Jules
*Assistant Examiner* — Steve Tanenbaum
(74) *Attorney, Agent, or Firm* — Mori & Ward, LLP

(57) ABSTRACT

An evaporator includes a cool storage material container. The cool storage material container contains a cool storage material and is disposed in a second part of the spaces. The cool storage material container includes a container main body portion joined to the refrigerant flow tubes. The outward projecting portion extends from an upper end of the leeward edge or windward edge of the container main body portion. The outward projecting portion has an expansion portion projecting from the container main body portion and projecting thickness of the expansion portion is greater than a thickness of the container main body portion. The expansion portion is located outward of the fins. At least one of left and right side walls of the expansion portion is so constructed to deform when an internal pressure in the cool storage material container increases beyond a predetermined pressure.

13 Claims, 9 Drawing Sheets

(51) Int. Cl.
  *F28D 1/03*   (2006.01)
  *F28D 20/02*  (2006.01)
  *F28D 1/053*  (2006.01)
  *F28D 21/00*  (2006.01)
  *F28D 20/00*  (2006.01)

(58) Field of Classification Search
  CPC .................. F28D 20/02; F28D 20/026; F28D 2020/0008; F28D 2020/0013
  USPC ............................................ 62/524; 165/177
  See application file for complete search history.

EVAPORATOR WITH COOL STORAGE FUNCTION

CROSS-REFERENCE TO RELATED APPLICATIONS

The present application claims priority under 35 U.S.C. §119 to Japanese Patent Application No. 2012-274355, filed Dec. 17, 2012. The contents of this application are incorporated herein by reference in their entirety.

BACKGROUND OF THE INVENTION

Field of the Invention

The present invention relates to an evaporator with a cool storage function.

Discussion of the Background

In recent years, in order to protect the environment and improve fuel consumption of automobiles, there has been proposed an automobile designed to automatically stop the engine when the automobile stops, for example, to wait for a traffic light to change.

However, an ordinary car air conditioner has a problem in that, when an engine of an automobile in which the air conditioner is mounted is stopped, a compressor driven by the engine is stopped, and supply of refrigerant to an evaporator stops, whereby the cooling capacity of the air conditioner drops sharply.

As one measure to solve such a problem, imparting a cool storage function to the evaporator has been considered, to thereby enable cooling of a vehicle compartment by releasing the cool stored in the evaporator, when the compressor stops as a result of stoppage of the engine.

The present applicant has proposed an evaporator with a cool storage function of such a type (see Japanese Patent Application Laid-Open (kokai) No. 2012-42167). In the proposed evaporator, a plurality of flat refrigerant flow tubes which extend in the vertical direction and whose width direction coincides with an air-passing direction are disposed between a pair of tanks spaced from each other in the vertical direction such that the refrigerant flow tubes are spaced from one another in the thickness direction thereof. The evaporator has spaces each formed between adjacent refrigerant flow tubes. Cool storage material containers contains a cool storage material are disposed in some spaces, and fins are disposed in the remaining spaces. Each cool storage material container has a container main body portion joined to the corresponding refrigerant flow tubes, and an outward projecting portion which extends from the leeward edge of the container main body portion over the entire length thereof in the vertical direction and which projects beyond the refrigerant flow tubes with respect to the air-passing direction. The outward projecting portion of each cool storage material container has an expansion portion which is expanded leftward and rightward in relation to the container main body portion and which has a dimension (measured in the left-right direction) greater than those of the container main body portion and the outward projecting portion. Each of the fins disposed in the spaces located adjacent to the space in which the cool storage material container is disposed has a fin main body portion joined to the corresponding refrigerant flow tubes, and an outward projecting portion which projects from the leeward edge of the fin main body portion and which projects beyond the refrigerant flow tubes with respect to the air-passing direction. The outward projecting portions of two fins are in contact with and are brazed to the outer surfaces of left and right side walls of the expansion portion of the outward projecting portion of the corresponding cool storage material container.

The evaporator with a cool storage function disclosed in the publication operates as follows. In an ordinary cooling period in which a compressor is operating, the cool carried by the refrigerant flowing through the refrigerant flow tubes is transferred to the cool storage material within each cool storage material container and is stored in the cool storage material. Meanwhile, when the compressor stops, the cool stored in the cool storage material within each cool storage material container is transferred to the fins disposed in the corresponding spaces through the refrigerant flow tubes to which the container main body thereof is brazed. Subsequently, the cool is released from the fins to air flowing through the spaces.

Incidentally, in general, a paraffin-based latent heat storage material whose melting point is adjusted to 3° C. to 10° C. is used as a cool storage material which is charged into cool storage material containers of an evaporator with a cool storage function of such a type.

Also, the strength of each cool storage material container is determined such that the cool storage material container does not break within an ordinary range of temperature of an environment in which the evaporator is used (hereinafter referred to as an "ordinary use environment temperature range") (e.g., within a range of −40° C. to 90° C.) even when the density of the cool storage material in the liquid phase changes and the air remaining in the cool storage material container thermally expands with a resultant increase in the internal pressure. However, if the ambient temperature becomes higher than the ordinary use environment temperature range, the change in the density of the cool storage material in the liquid phase and the thermal expansion of the air remaining in the cool storage material container become remarkable. In such a case, depending on a cool storage material charging ratio (the ratio of the volume of the charged cool storage material to the internal volume of the cool storage material container), the cool storage material container may break due to the internal pressure, and as a result, the refrigerant flow tubes may break. In particular, since the cool storage material container is composed of a container main body portion which is brazed to corresponding refrigerant flow tubes and an outward projecting portion to which corresponding fins are brazed, even when the internal pressure increases abnormally, the cool storage material container is unlikely to deform so as to absorb the increase in the internal pressure, and the breakage of the cool storage material container due to the internal pressure is more likely to occur.

In addition, in the evaporator with a cool storage function disclosed in the above-mentioned publication, each of the cool storage containers and the fins has an outward projecting portion which is formed over the entire length (in the vertical direction) such that the outward projecting portion projects beyond the refrigerant flow tubes, and the outward projecting portions of the corresponding fins are brazed to the outer surfaces of left and right side walls of the expansion portion of the outward projecting portion of each cool storage material container. Therefore, the size becomes relatively large, and the weight increases. Also, the cool storage material within each cool storage material container is effectively cooled at portions of the cool storage material container which are brazed to the corresponding refrigerant flow tubes. In the evaporator with a cool storage function disclosed in the above-mentioned publication, since the outward projecting portion of each cool storage material container is not brazed to the refrigerant flow tubes, the outward projecting portion is inferior to the container main body portion in terms of the effect of cooling the cool storage material within the cool storage material container. Since the outward projecting portion is provided over the entire length of the cool storage material container in the vertical direction, the conventional evaporator has a problem in that the amount of the cool storage material not cooled effectively increases.

In order to solve the above-mentioned problem, the present applicant has proposed an evaporator with a cool storage function which can prevent breakage of cool storage material containers due to an abnormal increase in the internal pressure (Japanese Patent Application Laid-Open (kokai) No. 2012-137199).

SUMMARY OF THE INVENTION

According to one aspect of the present invention, an evaporator with a cool storage function includes a plurality of flat refrigerant flow tubes, fins, and at least one cool storage material container. The plurality of flat refrigerant flow tubes have a longitudinal direction and are disposed in parallel and spaced apart from one another in a thickness direction of the refrigerant flow tubes to form spaces among the plurality of flat refrigerant flow tubes. The plurality of flat refrigerant flow tubes have a width direction perpendicular to the longitudinal direction and the thickness direction which is perpendicular to the longitudinal direction. Air is to flow along the width direction. The fins disposed in a first part of the spaces and joined to the plurality of flat refrigerant flow tubes. The at least one cool storage material container contains a cool storage material and is disposed in a second part of the spaces other than the first part. The at least one cool storage material container includes a container main body portion joined to the plurality of flat refrigerant flow tubes, an outward projecting portion which is continuous with only a portion of an entire length along the longitudinal direction of leeward edge or windward edge of the container main body portion such that the outward projecting portion projects beyond the plurality of flat refrigerant flow tubes in the width direction. The outward projecting portion has a length in the longitudinal direction smaller than a length of the container main body portion. The outward projecting portion extends over a predetermined length from an upper end of the leeward edge or windward edge of the container main body portion. The outward projecting portion has an expansion portion projecting from the container main body portion in the thickness direction and projecting thickness of the expansion portion in the thickness direction is greater than a thickness of the container main body portion. The expansion portion is located outward of the fins in the width direction. At least one of left and right side walls of the expansion portion is so constructed to deform when an internal pressure in the cool storage material container increases beyond a predetermined pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

An embodiment of the present invention will next be described with reference to the drawings.

Figure 2:
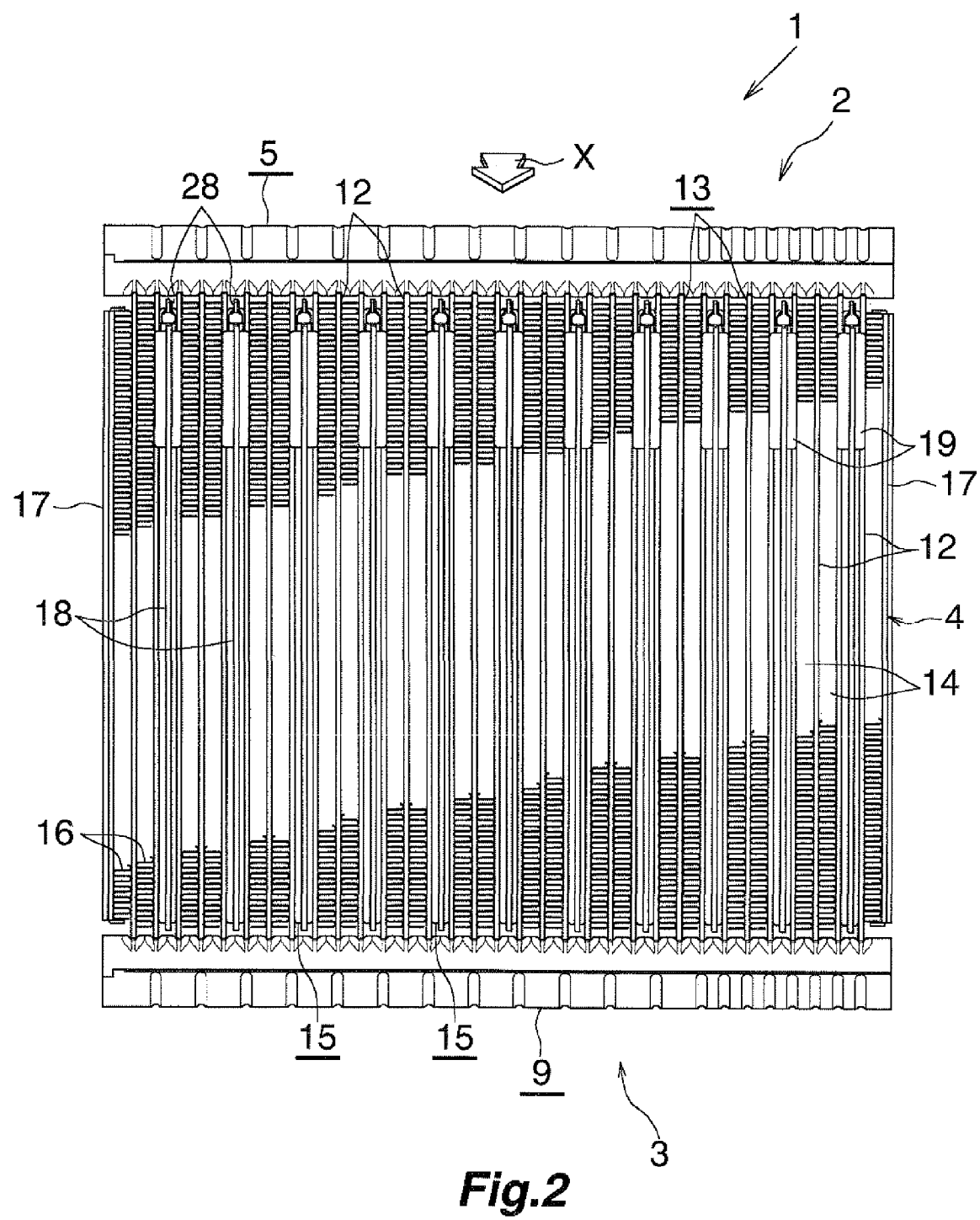
FIG. 2 is a front view showing the overall structure of the evaporator with a cool storage function according to an embodiment of the present invention as viewed from the downstream side in an air-passing direction.

In the embodiment, the upper, lower, left-hand, and right-hand sides of FIG. 2 will be referred to as "upper," "lower," "left, and "right," respectively.

Figure 3:
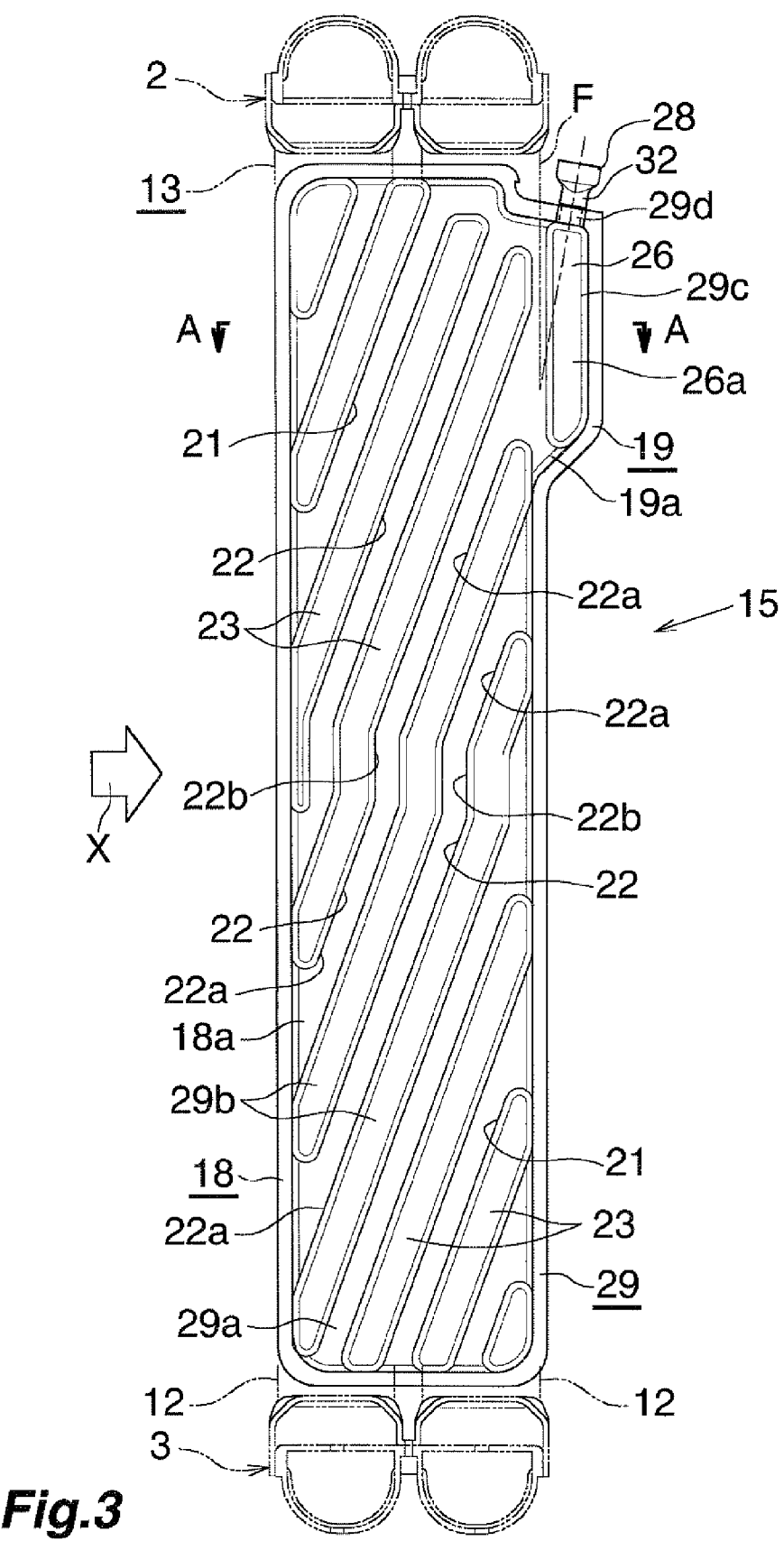
FIG. 3 is a left side view of a cool storage material container used in the evaporator with a cool storage function of FIGS. 1 and 2.
Figure 4:
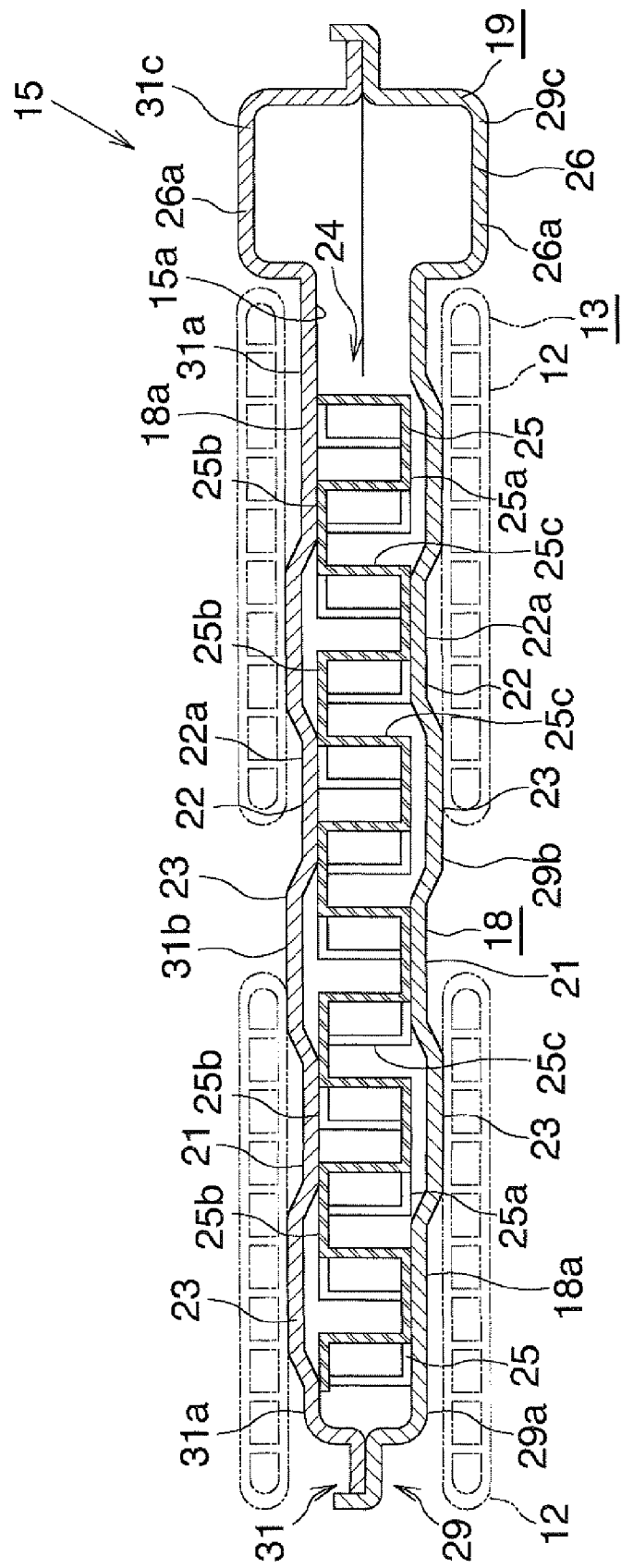
FIG. 4 is an enlarged sectional view taken along line A—A of FIG. 3.
Figure 5:
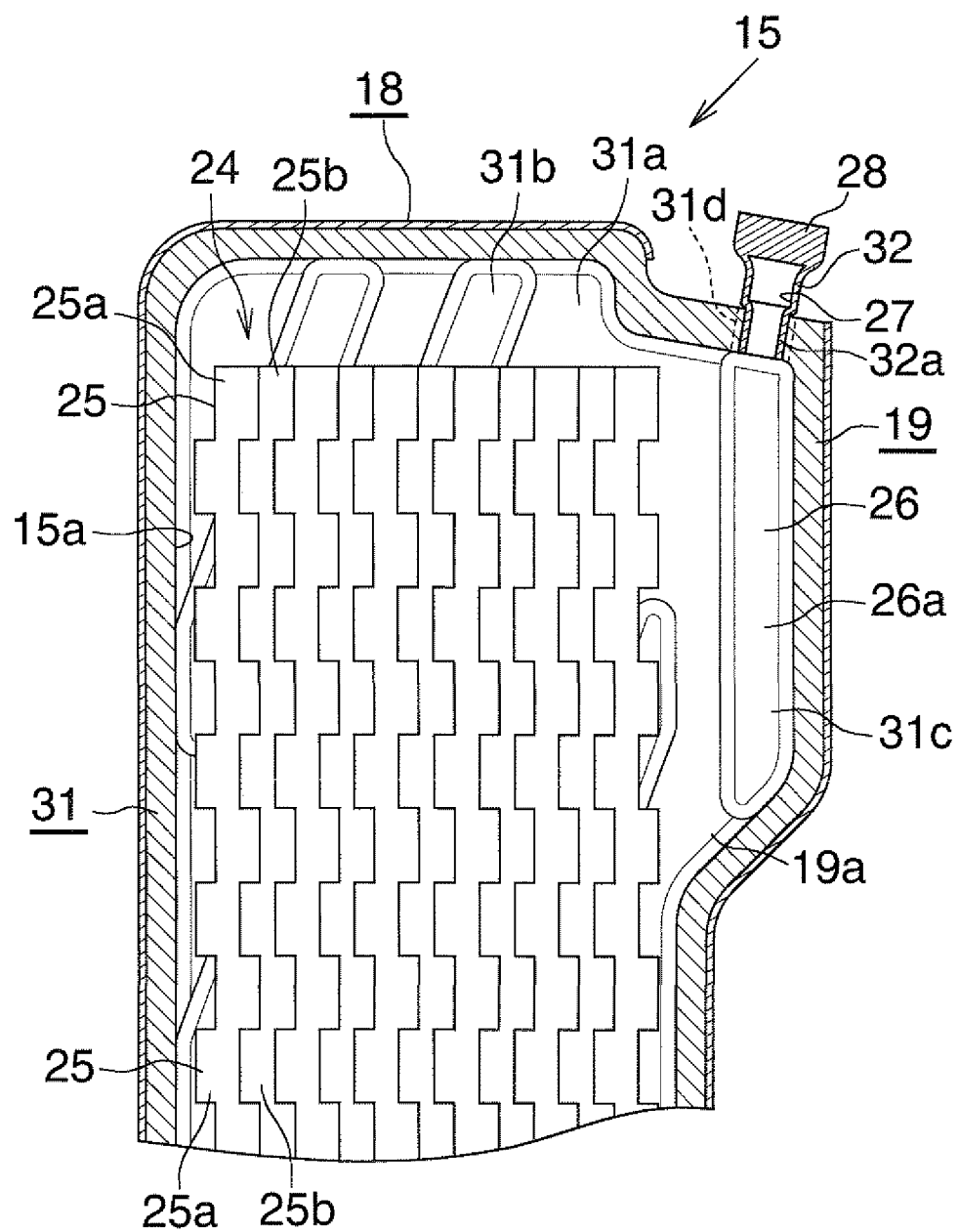
FIG. 5 is a view corresponding to a portion of FIG. 3 and showing an upper portion of a cool storage material container used in the evaporator with a cool storage function of FIGS. 1 and 2, with a metal plate on the left side being cut and removed.

In the following description, the downstream side with respect to an air-passing direction (a direction represented by arrow X in FIGS. 1 through 3) will be referred to as the "front," and the opposite side as the "rear." Accordingly, the upper, lower, left-hand, and right-hand sides of an evaporator as viewed rearward from the front side correspond to the upper, lower, left-hand, and right-hand sides of FIG. 2.

Furthermore, the term "aluminum" as used in the following description encompasses aluminum alloys in addition to pure aluminum.

Figure 1:
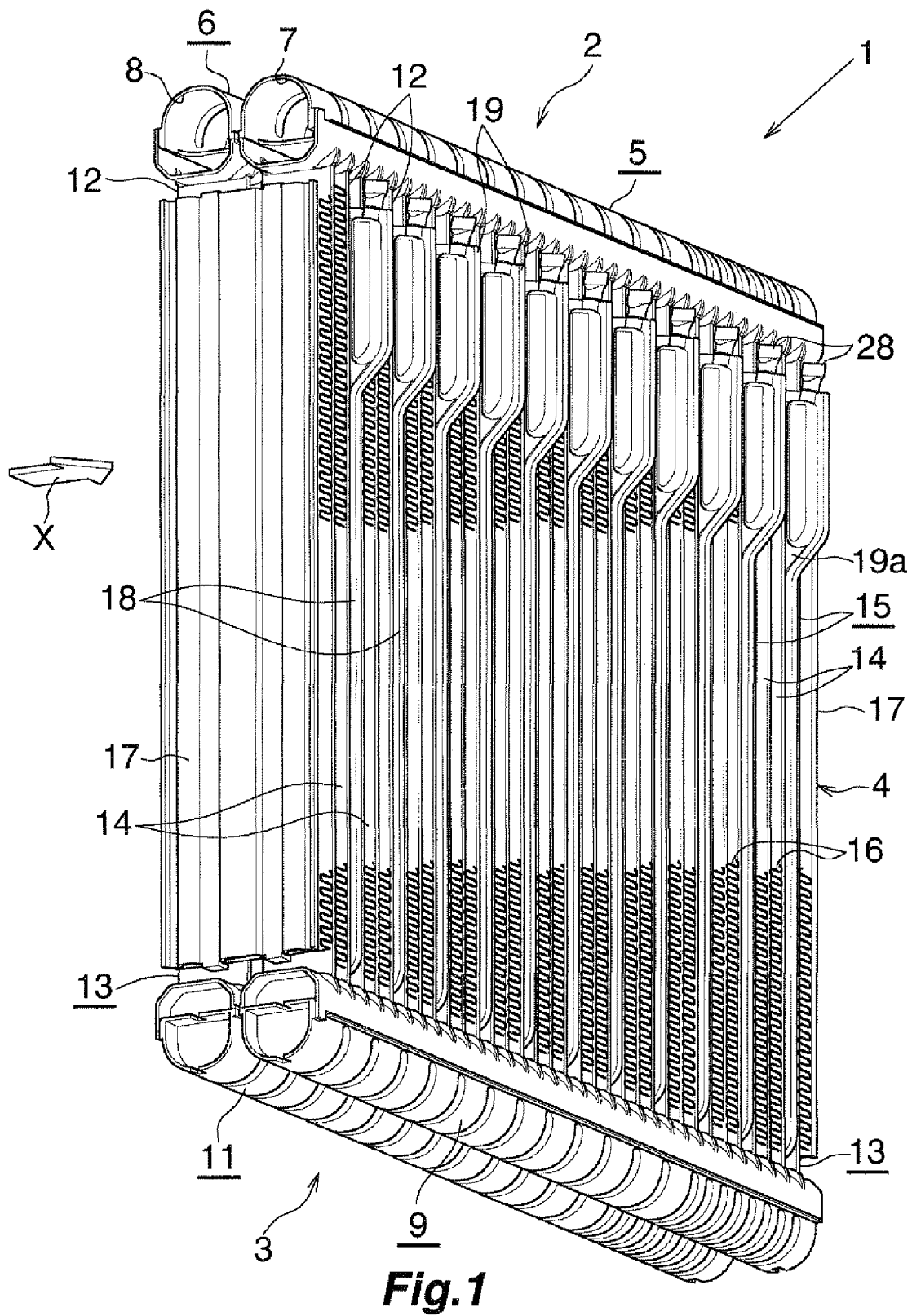
FIG. 1 is a perspective view showing the overall structure of an evaporator with a cool storage function according to an embodiment of the present invention.

FIGS. 1 and 2 show the overall configuration of an evaporator with a cool storage function according to the present invention, and FIGS. 3 to 7 show the configuration of an essential portion of the evaporator.

As shown in FIGS. 1 and 2, an evaporator with a cool storage function 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the left end of the leeward upper header section 5, and a refrigerant outlet 8 is provided at the left end of the windward upper header section 6. The second header tank 3 includes a leeward lower header section 9 located on the front side, and a windward lower header section 11 located on the rear side and united with the leeward lower header section 9.

In the heat exchange core section 4, a plurality of flat refrigerant flow tubes 12 which extend in the vertical direction, whose width direction coincides with the air-passing direction (the front-rear direction), and which are formed of aluminum extrudate are disposed in parallel such that they are spaced from one another in the left-right direction (the thickness direction of the refrigerant flow tubes 12). In the present embodiment, a plurality of pairs 13 each composed of two refrigerant flow tubes 12 spaced from each other in the front-rear direction are disposed at predetermined intervals in the left-right direction. A space 14 is formed between adjacent two of the pairs 13 each composed of the front and rear refrigerant flow tubes 12. An upper end portion of each front refrigerant flow tube 12 is connected to the leeward upper header section 5, and a lower end portion of each front refrigerant flow tube 12 is connected to the leeward lower header section 9. Similarly, an upper end portion of each rear refrigerant flow tube 12 is connected to the windward upper header section 6, and a lower end portion of each rear refrigerant flow tube 12 is connected to the windward lower header section 11.

A cool storage material container 15 which is formed of aluminum and which contains a cool storage material (not shown) is disposed in each of spaces 14 selected from all the spaces 14 of the heat exchange core section 4, the selected spaces 14 being not adjacent from one another, such that the cool storage material container 15 extends over the front and rear refrigerant flow tubes 12. Also, a corrugated outer fin 16—which is formed from an aluminum brazing sheet having a brazing material layer on each of opposite surfaces thereof and which has crest portions extending in the front-rear direction, trough portions extending in the front-rear direction, and connection portions connecting the crest portions and the trough portions—is disposed in each of the remaining spaces 14 such that the corrugated outer fin 16 extends over the front and rear refrigerant flow tubes 12, and is brazed to the front and rear refrigerant flow tubes 12 of the left-side and right-side pairs 13 which define the space 14. In the present embodiment, one outer fin 16 is disposed in each of the spaces 14 adjacently located on the left and right sides of the space 14 in which the cool storage material container 15 is disposed, and two outer fins 16 are disposed between the cool storage material containers 15 located adjacent to each other in the left-right direction. Notably, three or more outer fins 16 may be disposed between the cool storage material containers 15 located adjacent to each other in the left-right direction. Also, the outer fin 16, which is formed from an aluminum brazing sheet having a brazing material layer on each of opposite surfaces thereof, is disposed on the outer side of the pair 13 of the refrigerant flow tubes 12 located at the left end, and is disposed on the outer side of the pair 13 of the refrigerant flow tubes 12 located at the right end. These outer fins 16 are brazed to the corresponding front and rear refrigerant flow tubes 12. Furthermore, a side plate 17 formed of aluminum is disposed on the outer side of each of the outer fins 16 located at the left and right ends, respectively, and is brazed to the corresponding outer fin 16.

In the case of the evaporator 1 of the present embodiment, refrigerant passes through the refrigerant inlet 7, enters the leeward upper header section 5 of the evaporator 1, and passes through all the refrigerant flow tubes 12. The refrigerant then flows out of the refrigerant outlet 8 of the windward upper header section 6.

As shown in FIGS. 3 to 6, each cool storage material container 15 is a flat, hollow container disposed such that its longitudinal direction coincides with the vertical direction, and its widthwise direction coincides with the front-rear direction. Each cool storage material container 15 is composed of a container main body portion 18 and an outward projecting portion 19. The container main body portion 18 is located rearward of the front edges of the front refrigerant flow tubes 12, and is brazed to the front and rear (two) refrigerant flow tubes 12 of each of the corresponding pairs 13. The outward projecting portion 19 is continuous with only a portion (an upper portion in the present embodiment) of the front edge (leeward edge) of the container main body portion 18, and projects forward (outward in the air-passing direction) beyond the front edges of the front refrigerant flow tubes 12. A cool storage material charging space 15*a* is formed in the cool storage material container 15, excluding a peripheral edge portion thereof, such that the cool storage material charging space 15*a* extends across the container main body portion 18 and the outward projecting portion 19. The outward projecting portion 19 is provided over a predetermined length as measured from the upper end of the front edge of the container main body portion 18, and the length of the outward projecting portion 19 in the vertical direction is shorter than that of the container main body portion 18. Specifically, the length of the outward projecting portion 19 as measured in the vertical direction is preferably equal to or less than 30% that of the container main body portion 18 of the cool storage material container 15. The outward projecting portion 19 of the cool storage material container 15 is located outward of the outer fins 16 with respect to the air-passing direction. A lower edge portion 19*a* of the outward projecting portion 19 slopes downward toward the container main body portion 18 (toward the upstream side with respect to the air-passing direction). In the present embodiment, the thickness of the container main body portion 18 as measured in the left-right direction is equal to that of the outward projecting portion 19.

First and second condensed water drain passages 21 and 22 are formed on the outer surfaces of left and right side walls 18*a* of the container main body portion 18 of each cool storage material container 15 such that they extend from their upper ends toward their lower ends. In the present embodiment, the entirety of each first condensed water drain passage 21 slopes such that its lower end is located on the windward side in relation to its upper end, and each of the second condensed water drain passages 22 is composed of upper and lower slope portions 22*a* which are formed to be separated from each other in the vertical direction and which slope such that their lower ends are located on the windward side in relation to their upper ends, and a vertical portion 22*b* which establishes communication between the lower end of the upper slope portion 22*a* and the upper end of the lower slope portion 22*a*. The second condensed water drain passages 22 are formed in a region extending from an upper portion to a lower portion of the container main body portion 18 so as to cover a central portion of the container main body portion 18 in the vertical direction. The upper end of each of the condensed water drain passages 21 and 22 is open at the upper edge or the leeward edge of the container main body portion 18, and the lower end of each of the condensed water drain passages 21 and 22 is open at the lower edge or the windward edge of the container main body portion 18. Each condensed water drain passage 21, 22 is formed between two convex portions 23 bulging outward from each of the left and right side walls 18a of the container main body portion 18 of each cool storage material container 15. At least one of the two convex portions 23 which form a single condensed water drain passage 21, 22 has a length greater than the width of the container main body portion 18 of the cool storage material container 15 as measured in the air-passing direction. Notably, two adjacent condensed water drain passages 21, 22 share a convex portion 23 located between the two condensed water drain passages 21, 22. The bulging top walls of all the convex portions 23 are flat and are located on the same plane. The flat bulging top walls of the convex portions 23 are in contact with and are brazed to the corresponding refrigerant flow tube 12. The condensed water drain passages 21, 22 and the convex portions 23 of the left side wall 18a of the container main body portion 18 are slightly shifted in the air-passing direction from those of the right side wall 18a thereof such that the condensed water drain passages 21, 22 and the convex portions 23 of the left side wall 18a of the container main body portion 18 partially overlap (i.e., do not completely overlap) with those of the right side wall 18a thereof.

A staggered inner fin 24 formed of aluminum is disposed in the container main body portion 18 of each cool storage material container 15 such that the inner fin 24 extends over substantially the entire container main body portion 18 in the vertical direction. The inner fin 24 is formed by connecting together a plurality of wavy strips 25 disposed in parallel in the vertical direction. Each of the strips 25 has crest portions 25a extending in the vertical direction, trough portions 25b extending in the vertical direction, and connection portions 25c connecting the crest portions 25a and the trough portions 25b. The strips 25 are disposed such that the crest portions 25a and the trough portions 25b of one of two wavy strips 25 located adjacent to each other in the vertical direction are positionally shifted in the front-rear direction from the crest portions 25a and the trough portions 25b of the other wavy strip 25. The inner fin 24 is brazed to the inner surfaces of the left and right side walls 18a of the container main body portion 18 of the cool storage material container 15; i.e., portions of the left and right side walls 18a of the container main body portion 18 where the convex portions 23 are not formed. The bulging top walls of the convex portions 23 are not in contact with the inner fin 24 although the bulging top walls are in contact with the refrigerant flow tubes 12. Therefore, each side wall 18a of the container main body portion 18 of each cool storage material container 15 has contact portions which are in contact with the inner fin 24 and non-contact portions which are not in contact with the inner fin 24.

The outward projecting portion 19 of each cool storage material container 15 has an expansion portion 26 which expands in the left and right directions, excluding a narrow portion thereof located on the inner side with respect to the air-passing direction (on the rear side) so that the dimension of the expansion portion 26 in the left-right direction is greater than that of the container main body portion 18. The expansion portion 26 is located outward of the outer fins 16 with respect to the air-passing direction (on the downstream side in the air-passing direction), and has flat left and right side walls 26a. Notably, the left and right side walls 26a of the expansion portion 26 are not necessarily required to be flat, so long as at least one of the side walls 26a is flat. Also, at east one of the left and right side walls 26a of the expansion portion 26 is formed such that it deforms when the internal pressure of the cool storage material container 15 increases abnormally (e.g., when the temperature becomes higher than, for example, 90° C. which is the upper limit of the ordinary use environment temperature range, and is not required to be flat.

A paraffin-based latent heat storage material whose freezing is adjusted to 5° C. to 10° C. is used as a cool storage material which is charged into each cool storage material container 15. Specifically, pentadecane, tetradecane, or the like is used. Preferably, a cool storage material charging ratio (the ratio of the volume of the charged cool storage material to the volume of the internal space of the cool storage material container 15) is set to 70% to 90%. The cool storage material is charged into the cool storage material container 15 through a cool storage material charging inlet 27 which is provided in an upper end portion of the outward projecting portion 19 and is opened upward. The cool storage material charging inlet 27 is provided inside a cylindrical tubular charging member 32 which is fixed to the upper end portion of the outward projecting portion 19 and which establishes communication between the interior of the outward projecting portion 19 and the outside thereof. After the cool storage material is charged into the cool storage material container 15, the cool storage material charging inlet 27 is closed by crushing an upper portion of the charging member 32. As a result, a seal portion 28 formed as a result of closing the cool storage material charging inlet 27 is present at the upper end of the outward projecting portion 19. The seal portion 28 projects upward from the upper end of the outward projecting portion 19, and inclines (toward the leeward side in the present embodiment) in relation to an air-passing face F (a surface orthogonal to the air-passing direction; e.g., the front surface of the heat exchange core section 4) of the evaporator 1 such that the distance between the seal portion 28 and the container main body portion 18 increases upward (shown in FIG. 3).

The strength of each cool storage material container 15 is determined such that the cool storage material container 15 does not break within an ordinary use environment temperature range (e.g., within a range of −40° C. to 90° C.) even when the density of the cool storage material in the liquid phase changes and the air remaining in the cool storage material container 15 thermally expands with a resultant increase in the internal pressure.

Figure 6:
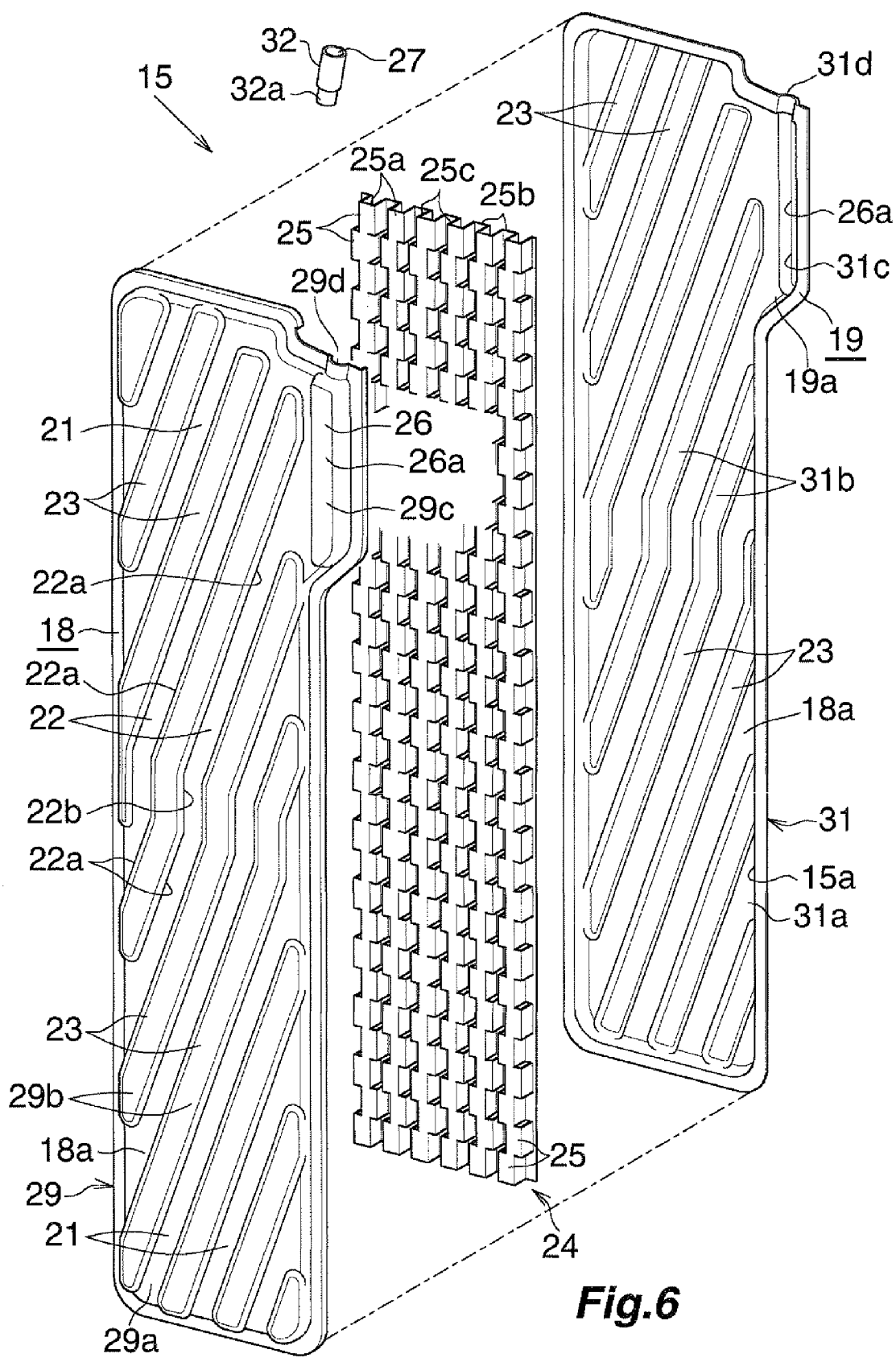
FIG. 6 is an exploded perspective view of the cool storage material container used in the evaporator with a cool storage function of FIGS. 1 and 2.

As specifically shown in FIG. 6, each cool storage material container 15 is composed of two generally rectangular aluminum plates 29 and 31 elongated in the vertical direction. Each of the aluminum plates 29 and 31 is formed by performing press work on an aluminum brazing sheet having a brazing material layer on each of opposite sides thereof. Strip-shaped peripheral edge portions of the aluminum plates 29 and 31 are brazed to each other. The aluminum plates 29 and 31, excluding strip-shaped peripheral edge portions thereof, are bulged outward so as to form first bulging portions 29a and 31a which form the container main body portion 18 and the outward projecting portion 19 and which have the same bulging height; second bulging portions 29b and 31b which are formed on the bulging top walls of portions of the first bulging portions 29a and 31a, the portions forming the container main body portion 18, and which are to become the convex portions 23; third bulging portions 29c and 31c which are formed on the bulging top walls of portions of the first bulging portions 29a and 31a, the portions forming the outward projecting portion 19, and which are to become the expansion portion 26; and semi-cylindrical-tubular fourth bulging portions 29d and 31d which extend upward from the upper ends of the third bulging portions 29c and 31c and which establish communication between the interiors of the third bulging portions 29c and 31c and the external space. The two aluminum plates 29 and 31 are combined with the inner fin 24 interposed therebetween such that the openings of the first bulging portions 29a and 31a face each other and a small diameter portion 32a of the charging member 32 provided at the lower end thereof is sandwiched between the fourth bulging portions 29d and 31d. In this state, the peripheral edge portions of the two aluminum plates 29 and 31 are brazed together, and the two aluminum plates 29 and 31 and the charging member 32 are brazed together, whereby the cool storage material container 15 is formed. The cool storage material is charged into the cool storage material container 15 through the cool storage material charging inlet 27 inside the charging member 32 whose upper portion has not yet been crushed. The cool storage material charging inlet 27 is closed by crushing the upper portion of the charging member 32, whereby the seal portion 28 is formed. The cool storage material charged into the cool storage material container 15 through the cool storage material charging inlet 27 first enters the outward projecting portion 19, and then enters the container main body portion 18. Since the lower edge portion 19a of the outward projecting portion 19 slopes downward toward the container main body portion 18, the cool storage material charged into the outward projecting portion 19 of the cool storage material container 15 through the cool storage material charging inlet 27 flows into the container main body portion 18 more easily.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front refrigerant flow tubes 12, and flows out from the refrigerant outlet 8 of the windward upper header section 6. When the refrigerant flows through the refrigerant flow tubes 12, the refrigerant performs heat exchange with air passing through the spaces 14, and flows out in a vapor phase.

When the compressor is operating, the cool carried by the refrigerant flowing through the refrigerant flow tubes 12 is transferred directly to the cool storage material within each cool storage material container 15 from the bulging top walls of the convex portions 23 of the left and right side walls 18a of the container main body portion 18 of the cool storage material container 15, the bulging top walls being brazed to the corresponding refrigerant flow tubes 12. Also, the cool is transferred from the bulging top walls of the convex portions 23 to the entire cool storage material within the cool storage material container 15 through the inner fin 24 and portions of the left and right side walls 18a, which portions are not brazed to the refrigerant flow tubes 12. Thus, the cool is stored in the cool storage material.

At that time, condensed water produced on the surface of each cool storage material container 15 enters the condensed water drain passages 21 and 22 formed on the outer surfaces of the left and right side walls 18a of the container main body portion 18 of the cool storage material container 15, and is drained downward.

When the compressor stops, the cool stored in the cool storage material within each cool storage material container 15 is transferred directly to the refrigerant flow tubes 12 from the bulging top walls of the convex portions 23 of the left and right side walls 18a of the container main body portion 18 of the cool storage material container 15, the bulging top walls being brazed to the corresponding refrigerant flow tubes 12. The stored cool is also transferred from the inner fin 24 to the refrigerant flow tubes 12 through the portions of the left and right side walls 18a, which portions are not brazed to the refrigerant flow tubes 12, and the bulging top walls of the convex portions 23. The cool then passes through the refrigerant flow tubes 12 and propagates to the outer fins 16 brazed to the sides of the refrigerant flow tubes 12 opposite the cool storage material container 15. Subsequently, the cool is transferred via the outer fins 16 to air passing through the spaces 14 adjacently located on the opposite sides of the space 14 in which the cool storage material container 15 is disposed. Accordingly, even when the temperature of air having passed through the evaporator 1 increases, the air is cooled, so that a sharp drop in the cooling capacity can be prevented.

Figure 7:
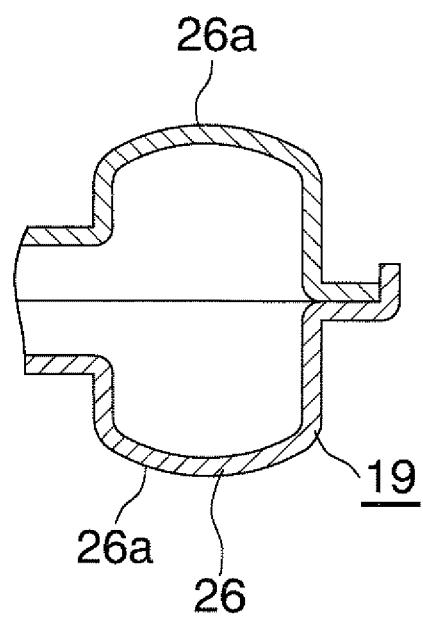
FIG. 7 is a view corresponding to a portion of FIG. 4 and showing a state in which the internal pressure of the cool storage material container used in the evaporator with a cool storage function of FIGS. 1 and 2 has increased abnormally.

When the ambient temperature becomes higher than the ordinary use environment temperature range (for example, becomes 100° C.), the change in the density of the cool storage material in the liquid phase and the thermal expansion of air remaining in the cool storage material container 15 become remarkable, and the internal pressure of the cool storage material container 15 increases abnormally. However, in this case, as shown in FIG. 7, the left and right side walls 26a of the expansion portion 26 provided on the outward projecting portion 19 of the cool storage material container 15 deform to expand outward, whereby breakage of the cool storage material container 15 due to an increase in the internal pressure is prevented. In addition, since the strength of the outward projecting portion 19 projecting toward the leeward side in relation to the outer fins 16 is lower than the strength of the container main body portion 18 brazed to the refrigerant flow tubes 12, when the ambient temperature increases further, the cool storage material container 15 may break at the outward projecting portion 19 with resultant leakage of the cool storage material. However, since the refrigerant flow tubes 12 are not affected by the breakage of the cool storage material container 15, breakage of the refrigerant flow tubes 12 is prevented. In addition, since leakage of the cool storage material occurs at a fixed (same) position, measures against the leaked cool storage material can be taken relatively simply.

Figure 8:
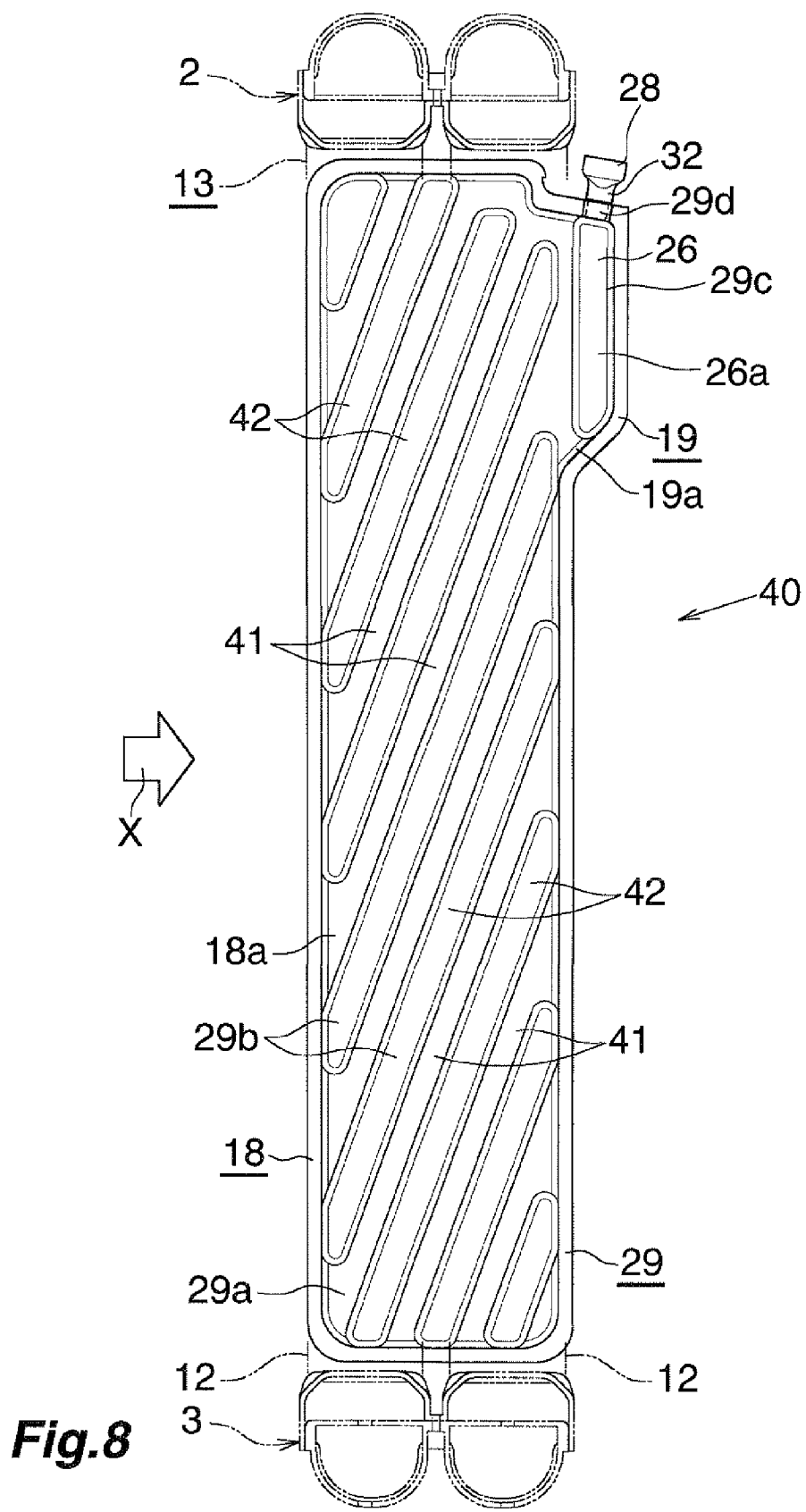
FIG. 8 is a view corresponding to FIG. 3 and showing a modification of the cool storage material container used in the evaporator with a cool storage function of FIGS. 1 and 2.

FIG. 8 shows a modification of the cool storage material container used in the evaporator with a cool storage function according to the present invention.

In the case of a cool storage material container 40 shown in FIG. 8, a plurality of condensed water drain passages 41 are formed on the outer surface of each of the left and right side walls 18a of the container main body portion 18 such that the condensed water drain passages 41 are spaced from one another and extend from their upper ends toward their lower ends. The entirety of each condensed water drain passage 41 slopes such that its lower end is located on the windward side in relation to its upper end. The upper end of each of all the condensed water drain passages 41 is open at the upper edge or the leeward edge of the container main body portion 18, and the lower end of each of all the condensed water drain passages 41 is open at the lower edge or the windward edge of the container main body portion 18. Each condensed water drain passage 41 is formed between two convex portions 42 bulging outward from each of the left and right walls 18a of the container main body portion 18 of each cool storage material container 15. At least one of the two convex portions 42 which form a single condensed water drain passage 41 has a length greater than the width of the container main body portion 18 of the cool storage material container 15 as measured in the air-passing direction. Notably, two adjacent condensed water drain passages 41 share a convex portion 42 located between the two condensed water drain passages 41. The bulging top walls of all the convex portions 42 are flat and are located on the same plane. The flat bulging top walls of the convex portions 42 are in contact with and are brazed to the corresponding refrigerant flow tube 12. Although not illustrated, the condensed water drain passages 41 and the convex portions 42 of the left side wall 18a of the container main body portion 18 are slightly shifted in the air-passing direction from those of the right side wall 18a thereof such that the condensed water drain passages 41 and the convex portions 42 of the left side wall 18a of the container main body portion 18 partially overlap (i.e., do not completely overlap) with those of the right side wall 18a thereof.

The structure of the remaining portion is the same as that of the above-described cool storage material container 15, and like portions are denoted by like reference numerals. Notably, the cool storage material container 40 is also composed of two generally rectangular aluminum plates 29 and 31 each of which is formed by performing press work on an aluminum brazing sheet having a brazing material layer on each of opposite sides thereof, and whose strip-shaped peripheral edge portions are brazed to each other. The aluminum plates 29 and 31 have first bulging portions 29a and 31a which form the container main body portion 18 and the outward projecting portion 19 and which have the same bulging height; second bulging portions 29b and 31b which are formed on the bulging top walls of portions of the first bulging portions 29a and 31a, the portions forming the container main body portion 18, and which are to become the convex portions 42; third bulging portions 29c and 31c which are formed on the bulging top walls of portions of the first bulging portions 29a and 31a, the portions forming the outward projecting portion 19, and which are to become the expansion portion 26; and semi-cylindrical-tubular fourth bulging portions 29d and 31d which extend upward from the upper ends of the third bulging portions 29c and 31c and which establish communication between the interiors of the third bulging portions 29c and 31c and a space on the upper side.

Figure 9:
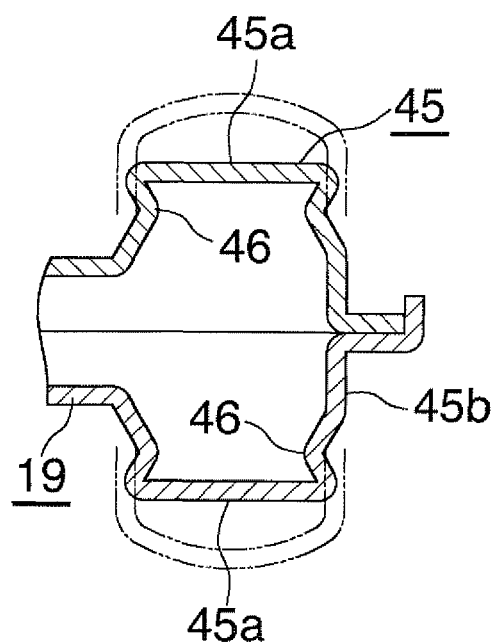
FIG. 9 is a view corresponding to a portion of FIG. 4 and showing a modification of an expansion portion provided on an outward projecting portion of the cool storage material container used in the evaporator with a cool storage function of FIGS. 1 and 2.

FIG. 9 shows a modification of the expansion portion provided on the outward projecting portion of the cool storage material container used in the evaporator with a cool storage function according to the present invention.

In the case of an expansion portion 45 provided on the outward projecting portion 19 of the cool storage material container shown in FIG. 9, the left and right side walls 45a thereof are flat, and a bent portion 46 bent inward is provided at an intermediate position (in the height direction) of a portion(s) (left and right portions in the present embodiment) of the circumferential wall 45b of the expansion portion 45, the portion(s) being located on the side(s) toward which the expansion portion 45 expands in relation to the container main body portion 18. Notably, a bent portion bent outward may be provided at an intermediate position (in the height direction) of each of the left and right portions of the circumferential wall 45b of the expansion portion 45, the portions expanding in relation to the container main body portion 18. In the case where the expansion portion 45 shown in FIG. 9 is provided, when the internal pressure of the cool storage material container 15 increases abnormally, as indicated by chain lines in FIG. 9, the circumferential wall 45b of the expansion portion 45 of the cool storage material container 15 deforms to extend outward in the left-right direction, and the left and right side walls 45a deform to bulge outward, whereby breakage of the cool storage material container 15 due to an increase in the internal pressure is prevented.

In the above-described embodiment and modifications, the expansion portion 26, 45 provided on the outward projecting portion 19 of the cool storage material container 15, 40 bulge leftward and rightward in relation to the container main body portion 18. However, the structure of the expansion portion 26, 45 is not limited thereto, and may be configured such that the expansion portion 26, 45 bulges in only one of the leftward and rightward directions.

According to the evaporator with a cool storage function in the embodiments, the cool storage material container has a container main body portion joined to the corresponding refrigerant flow tubes, and an outward projecting portion which is continuous with only a portion of a vertically extending leeward edge or windward edge of the container main body portion such that the outward projecting portion projects beyond the refrigerant flow tubes in the air-passing direction, the outward projecting portion having a length in the vertical direction smaller than that of the container main body portion; the outward projecting portion extends over a predetermined length from an upper end of the leeward edge or windward edge of the container main body portion; the outward projecting portion has an expansion portion which expands in relation to the container main body portion in at least one of leftward and rightward directions and whose dimension in the left-right direction is greater than that of the container main body portion; the expansion portion is located outward of the fins in the air-passing direction; and at least one of left and right side walls of the expansion portion deforms when the internal pressure of the cool storage material container increases abnormally. Therefore, when the internal pressure of the cool storage material container increases abnormally, at least one of the left and right side walls of the expansion portion of the outward projecting portion deforms so as to prevent breakage of the cool storage material container, which breakage would otherwise occur due to an abnormal increase in the internal pressure. Notably, the internal pressure of the cool storage material container increases abnormally, for example, when the temperature becomes higher than 90° C. which is the upper limit of the ordinary use environment temperature range.

In addition, the outward projecting portion of the cool storage material container is continuous with only a portion of the vertically extending leeward edge or windward edge of the container main body portion, and is provided over only a predetermined length from the upper end of the leeward edge or windward edge of the container main body portion. Therefore, the size and weight of the evaporator can be reduced as compared with the evaporator with a cool storage function described in the above-mentioned two publications in which the outward projecting portion of each cool storage material container projecting outward of refrigerant flow tubes is provided over the entire vertical lengths of all the cool storage material containers and the fins, the outward projecting portion has an expansion portion which expands in the left-right direction and whose dimension in the left-right direction is greater than those of the container main body portion and the outward projecting portion, and the outward projecting portions of the corresponding fins are brazed to the left and right side surfaces of the expansion portion of the outward projecting portion of each cool storage material container.

Also, since the outward projecting portion of the cool storage material container is continuous with only a portion of the vertically extending leeward edge or windward edge of the container main body portion and is provided over only a predetermined length from the upper end of the leeward edge or windward edge of the container main body portion, portions of the cool storage material container which are not in contact with the refrigerant flow tubes become smaller as compared with the evaporator with a cool storage function described in the above-mentioned two publications. Therefore, a greater portion of the cool storage material charged into the cool storage material container can be cooled effectively. Moreover, the amount of the cool storage material present in the outward projecting portion which is not in direct contact with the refrigerant flow tubes can be reduced, whereby a portion of all the cool storage material charged into the cool storage material container, which portion is not cooled effectively, can be reduced in amount. Namely, the strength of the cool storage material container and the cool storage material charging ratio (the ratio of the volume of the charged cool storage material to the volume of the internal space of the cool storage material container) are designed such that the cool storage material container does not break within the ordinary use environment temperature rang (e.g., within a range of −40° C. to 90° C.) even when the density of the cool storage material in the liquid phase changes and the air remaining in the cool storage material container thermally expands with a resultant increases in the internal pressure. Since such a cool storage material charging ratio is of course less than 100%, a space which is not occupied by the cool storage material is present near the upper end of the cool storage material container. Therefore, the entire interior of the outward projecting portion provided over a predetermined length from the upper end of the leeward edge or windward edge of the container main body portion is not filled with the cool storage material. As a result, the amount of the cool storage material not cooled effectively (of all the cool storage material charged into the cool storage material container) can be reduced.

According to the embodiments, the effect of reducing the amount of the cool storage material not cooled effectively (of all the cool storage material charged into the cool storage material container) can be enhanced further.

According to the embodiments, when the internal pressure of the cool storage material container increases abnormally, the left and right flat side walls of the expansion portion of the outward projecting portion deform to bulge outward to thereby prevent breakage of the cool storage material container due to an abnormal increase in the internal pressure. Therefore, the structure of the evaporator becomes relatively simple.

According to the embodiments, for example, when the cool storage material is charged into the cool storage material container through a cool storage material charging inlet provided on the outward projecting portion as described in par. 7), the cool storage material easily flows into the container main body portion. Therefore, the cool storage material can be changed into cool storage material container quickly.

According to the embodiments, when the internal pressure of the cool storage material container increases abnormally, in addition to deformation of the flat top wall of the expansion portion of the outward projecting portion, deformation of the circumferential wall occurs such that the circumferential wall expands, whereby breakage of the cool storage material container due to an abnormal increase in the internal pressure can be prevented effectively.

According to the embodiments, the operation of charging the cool storage material into the cool storage material container through the cool storage material charging inlet and the operation of closing the cool storage material charging inlet are facilitated.

According to the embodiments, the operation of charging the cool storage material into the cool storage material container in a sealed condition can be performed easily.

According to the embodiments, breakage of the cool storage material container due to the internal pressure is prevented even when the density of the cool storage material in the liquid phase changes and the air remaining in the cool storage material container thermally expands within a range of temperature of the environment in which the evaporator is used (e.g., within a range of −40° C. to 90° C.).

In the above-described embodiment and modifications, the outward projecting portion 19 is provided at the leeward edge of the container main body portion 18 of the cool storage material container 15, 40. However, the outward projecting portion 19 may be provided at the windward edge of the container main body portion 18 such that the outward projecting portion 19 projects beyond the refrigerant flow tubes 12 in the air-passing direction.

Obviously, numerous modifications and variations of the present invention are possible in light of the above teachings. It is therefore to be understood that within the scope of the appended claims, the invention may be practiced otherwise than as specifically described herein.

What is claimed is:

1. An evaporator with a cool storage function, the evaporator comprising:
   refrigerant flow tubes each having a thickness as measured in an arranging direction, the refrigerant flow tubes arranged in the arranging direction and substantially in parallel with each other with spaces among the refrigerant flow tubes, the spaces including fin spaces and cool storage material container spaces;
   fins respectively provided in the fin spaces and joined to the refrigerant flow tubes; and cool storage material containers each containing a cool storage material therein and provided in each of the cool storage material container spaces, the cool storage material containers not in fluid communication with each other, each of the cool storage material containers comprising:
   a container main body provided in each of the cool storage material container spaces and joined to the refrigerant flow tubes, the container main body having a body thickness in the arranging direction;
   a projecting portion connected to the container main body and projecting beyond adjacent fins in a direction orthogonal to the arranging direction; and
   an expansion portion provided in the projecting portion, the expansion portion projecting in the arranging direction and having an expansion portion thickness in the arranging direction, the expansion portion thickness being larger than the body thickness.

2. The evaporator according to claim 1, wherein the expansion portion includes a first side wall and a second side wall opposite to the first side wall in the arranging direction, and wherein at least one of the first side wall and the second side wall has a flat surface.

3. The evaporator according to claim 1, wherein the projecting portion has a substantially trapezoidal shape viewed in the arranging direction, and wherein a lower base of the substantially trapezoidal shape is connected to the container main body viewed in the arranging direction.

4. The evaporator according to claim 1, wherein the projecting portion includes a sealed portion at which a cool storage material charging inlet has been sealed after the cool storage material having been charged into the cool storage material container through the cool storage material charging inlet.

5. The evaporator according to claim 4, wherein the sealed portion projects from the projecting portion at an inclined angle toward a leeward side of the evaporator with respect to a flow direction of air capable of passing through the evaporator.

6. The evaporator according to claim 1, wherein a ratio of a volume of the cool storage material charged in each of the cool storage material containers to a volume of an internal space of each of the cool storage material containers is 70% to 90%.

7. The evaporator according to claim 1, wherein each of the cool storage material container spaces is sandwiched between the fin spaces.

8. The evaporator according to claim 1, wherein each of the refrigerant flow tubes includes a tube surface substantially perpendicular to the arranging direction, the tube surface including a tube leeward edge with respect to a flow direction of air capable of passing through the evaporator, the projecting portion projecting leeward from the tube leeward edge.

9. The evaporator according to claim 1, wherein the expansion portion is configured to expand in the arranging direction without contacting the fins.

10. The evaporator according to claim 1, wherein the direction orthogonal to the arranging direction is aligned with a flow direction of air capable of passing through the evaporator.

11. An evaporator with a cool storage function, the evaporator comprising:
refrigerant flow tubes each having a thickness as measured in an arranging direction, the refrigerant flow tubes arranged in the arranging direction and substantially in parallel with each other with spaces among the refrigerant flow tubes, the spaces including fin spaces and cool storage material container spaces;
fins respectively provided in the fin spaces and joined to the refrigerant flow tubes; and cool storage material containers each containing a cool storage material therein and provided in each of the cool storage material container spaces, a first one of the cool storage material containers comprising:
a container main body provided in one of the cool storage material container spaces and joined to adjacent refrigerant flow tubes, the container main body having a body thickness in the arranging direction;
a projecting portion connected to the container main body and projecting beyond adjacent fins in a direction orthogonal to the arranging direction, the projecting portion not providing fluid communication with a second cool storage material container; and
an expansion portion provided in the projecting portion, the expansion portion projecting in the arranging direction and having an expansion portion thickness in the arranging direction, the expansion portion thickness being larger than the body thickness.

12. The evaporator according to claim 11, wherein the expansion portion is configured to expand in the arranging direction without contacting the fins.

13. The evaporator according to claim 11, wherein the direction orthogonal to the arranging direction is aligned with a flow direction of air capable of passing through the evaporator.

* * * * *